United States Patent [19]

Bush

[11] 4,214,371
[45] Jul. 29, 1980

[54] DEVICE FOR ILLUMINATING RETICLES IN OPTICAL INSTRUMENTS

[76] Inventor: Benjamin F. Bush, 7860 Eagles Nest Rd., Sacramento, Calif. 95826

[21] Appl. No.: 763,236

[22] Filed: Jan. 27, 1977

[51] Int. Cl.³ .............................................. F41G 1/32
[52] U.S. Cl. ........................................ 33/241; 350/10
[58] Field of Search .................. 33/241, 242, 233; 362/110; 356/247, 251; 350/10; 250/467

[56] References Cited

U.S. PATENT DOCUMENTS

| | | | |
|---|---|---|---|
| 803,969 | 11/1905 | Bassell et al. | 33/241 |
| 1,982,058 | 11/1934 | King | 33/242 |
| 2,891,437 | 6/1959 | Tripp | 356/247 |
| 3,064,526 | 11/1962 | Lindsay | 350/10 |
| 3,121,163 | 2/1964 | Rickert | 356/247 X |

*Primary Examiner*—Harry N. Haroian

[57] ABSTRACT

A mirror, or mirrors, or other devices, placed in the vicinity of the reticle, or reticles, to reflect, or refract light coming in, or onto, the objective lens of the instrument, and then onto the reticle, or reticles, in such a manner as to illuminate the reticle, or reticles.

4 Claims, 18 Drawing Figures

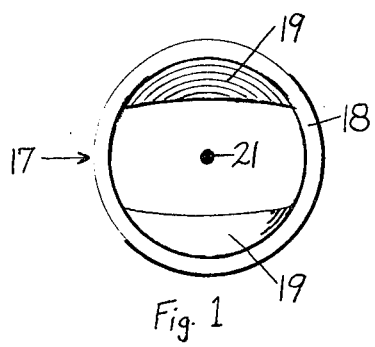
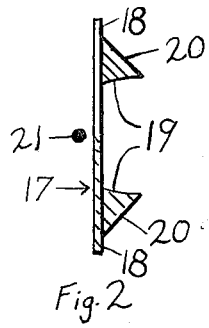
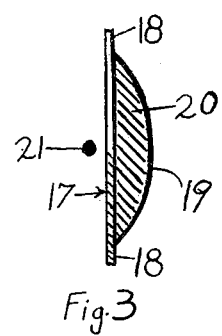
Fig. 1　　　　Fig. 2　　　　Fig. 3
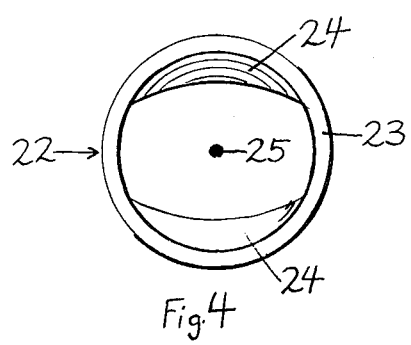
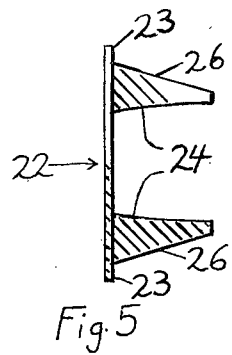
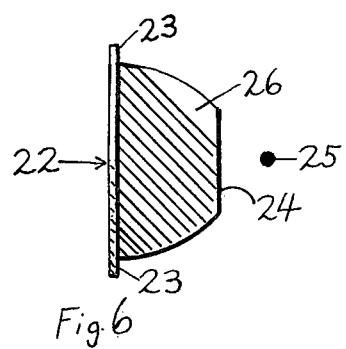
Fig. 4　　　　Fig. 5　　　　Fig. 6
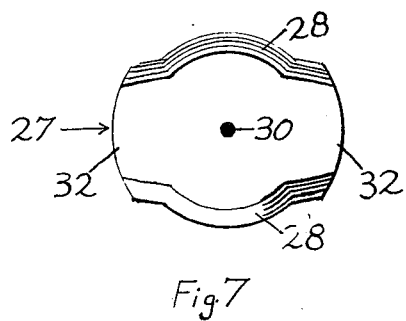
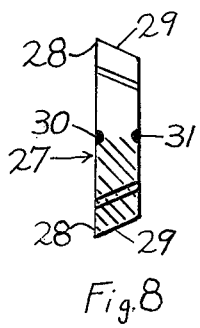
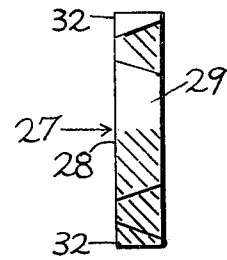
Fig. 7　　　　Fig. 8　　　　Fig. 9
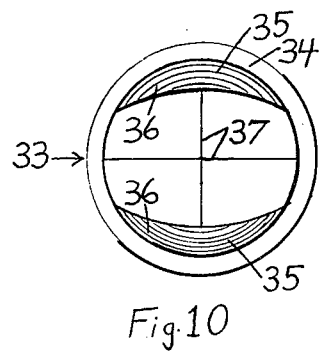
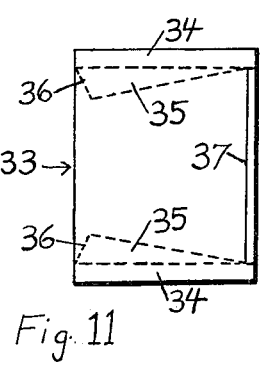
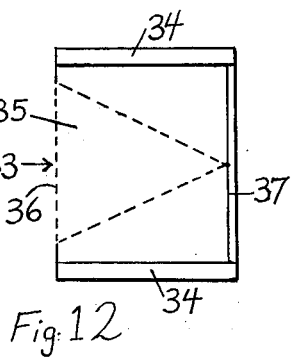
Fig. 10　　　Fig. 11　　　Fig. 12
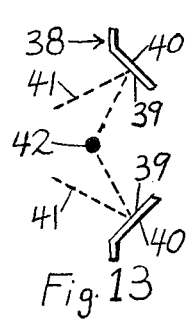
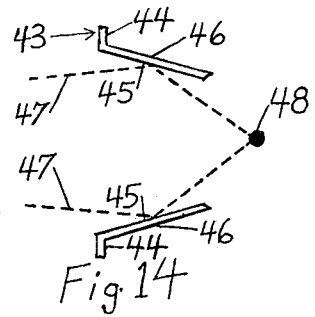
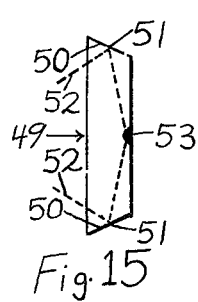
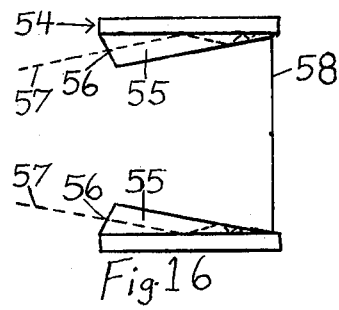
Fig. 13　　Fig. 14　　Fig. 15　　Fig. 16

DEVICE FOR ILLUMINATING RETICLES IN OPTICAL INSTRUMENTS

SUMMARY OF THE INVENTION

This invention relates to a modification that can be performed on telescopic weapons sights, and other optical instruments, to improve the visibility of the reticle when the instrument is used in poor lighting conditions. The improvement in visibility to be brought about by illuminating the reticle, or reticles.

The principle object of the invention is to allow a hunter to shoot accurately in adverse lighting conditions, with a system that is both inexpensive and effective.

This invention consists of one or more mirrors, or other devices, placed in or about the reticle cell. The one or more mirrors, or devices are arranged so as to reflect light coming from the objective of the instrument, onto, into, or through the reticle, or reticles. The reticle, or reticles must have acceptable properties as to be clearly visible upon illumination.

There are four basic variations of the invention: first, a mirror, or mirrors placed behind a light colored, or metallic reticle, or reticles, so as to reflect light upon the reticle, or reticles from behind; second, a mirror, or mirrors placed in front of a translucent reticle, or reticles, so as to shine light through the reticle, or reticles, from in front; third, a mirror, or mirrors formed through beveling and "silvering" the edge of a glass reticle, or reticles, so as to shine light on the reticle, or reticles from the side, and take advantage of the light guide effect of the glass (as in fiber optics); fourth, a specially formed fiber optics element, to form a light "funnel", to collect light and channel it down a optical fiber (optical wave guide) reticle.

Due to the multitude of optical instruments in which this invention can be used, and the various results that may be desired, there must be a multitude of different models of the invention, to fit the various instruments.

With the above and other objects and advantages that may appear to one skilled in the art, it will be clearly understood that the invention will consist of the special arrangement of a mirror, or mirrors, or other devices, as will be later described and illustrated in the accompanying drawings, in which:

BRIEF DESCRIPTION OF THE DRAWINGS

FIG. 1 is a front view of the first variation of the invention.

FIG. 2 is a side view of the first variation of the invention.

FIG. 3 is a top view of the first variation of the invention.

FIG. 4 is a front view of the second variation of the invention.

FIG. 5 is a side view of the second variation of the invention.

FIG. 6 is a top view of the second variation of the invention.

FIG. 7 is a front view of the third variation of the invention.

FIG. 8 is a side view of the third variation of the invention.

FIG. 9 is a top view of the third variation of the invention.

FIG. 10 is a front view of the fourth variation of the invention.

FIG. 11 is a side view of the fourth variation of the invention.

FIG. 12 is a top view of the fourth variation of the invention.

FIG. 13 is a cross section of the first variation of the invention, showing the path of the light.

FIG. 14 is a cross section of the second variation of the invention, showing the path of the light.

FIG. 15 is a cross section of the third variation of the invention, showing the path of the light.

FIG. 16 is a cross section of the fourth variation of the invention, showing the path of the light.

DESCRIPTION OF THE PREFERRED EMBODIMENTS

Figure 17:
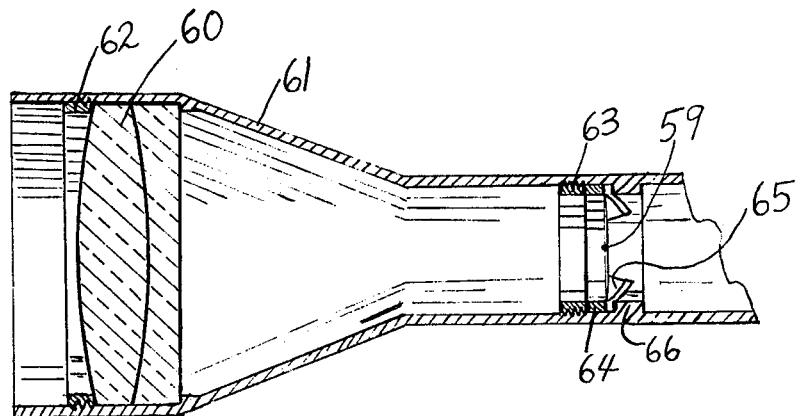
FIG. 17 is a cross section of the device showing the relative positions of the objective lens, the reticle and the first variation of the mirror, all mounted in the instrument tube.

Referring to FIGS. 1, 2 and 3, the first variation of the device 17, is shown to comprise a mounting rim 18, which is used to mount the mirror, or mirrors into a reticle cell, or any other cell, of the instrument. Mounted within the mounting rim 18, is a mirror 19, with the reflecting surface of the mirror facing and 20 is the backside of the mirror 19, which may be blackened. The dot 21 represents the position of a reticle, which is metallic, or of a light colored or otherwise reflecting material.

Referring to FIGS. 4, 5 and 6, the second variation of the device 22, is shown to comprise a mounting rim 23, which is used to mount the mirror, or mirrors into a reticle cell, or any other cell, of the instrument. Mounted within the mounting rim 23, is a mirror, 24, which is shown to have a different shape and angle than the mirror 19, in FIGS. 1, 2 and 3. 26 is the backside of the mirror 24, which may be blackened, 25 represents the position of a reticle, which is made of a translucent material.

In FIGS. 7, 8 and 9, the third variation of the device 27, the glass reticle has part of the edge specially beveled and "silvered" to form a mirror 28. The back of the mirror, 29, may be blackened. A reticle 30, or 31 is etched, or otherwise formed into, or onto the glass. The reticle is mounted into a cell, or cells of the instrument, by using the unmirrored portion of the edge of the reticle, 32, as a mounting rim.

In FIGS. 10, 11 and 12, the fourth variation of the device 33, is shown to comprise a reticle cell which is, in this case, a short tube 34, which is used to mount the reticle into the instrument. Mounted within the cell 34, in this case, are two light "funnels", 35 (outlined in FIGS. 11, and 12 with broken lines, in cross section), that are composed of a transparent refracting material which may or may not be silvered and/or blackened, except on the light collecting surface 36. As long as the incoming light is within the critical angle of the refracting material it will be reflected about within the material, and so intensity concentration can take place. The optical fiber 37 is part of the reticle, and carries light through it, thus illuminating itself, or the reticle, through special characteristics that may be imparted upon it. Both crosshairs of the reticle can be illuminated in this way.

The function of the first variation of the device is illustrated in FIG. 13, by a cross section of the device 38. 39 represents the reflecting surface of the mirror. 40 represents the back side of the mirror, which may be blackened. 41 is the path taken by the light, represented by the broken lines. 42 represents the position of a reticle.

The function of the second variation of the device is illustrated in FIG. 14, by a cross section of the device, 43. 44 represents the mounting rim. 45 represents the reflecting surface of the mirror. 46 represents the back side of the mirror, which may be blackened. 47 is the path taken by the light, represented by the broken lines. 48 represents the position of a reticle.

The function of the third variation of the device is illustrated in FIG. 15, by a cross section of the device 49. 50 represents the reflecting surface of the mirror. 51 represents the back side of the mirror, which may be blackened. 52 is the path taken by the light, represented by the broken lines. 53 represents a position of a reticle.

The function of the fourth variation of the device is illustrated in FIG. 16, by a cross section of the device 54. 55 represents the light "funnel" which may be silvered and/or blackened, except on its light collecting surface 56. 57 is the path taken by the light, represented by broken lines. 58 represents the reticle, which is made out of an optical fiber, and may be treated to give it special characteristics, for the dispersion of light.

FIG. 17 shows the device wherein the reticle 59 is in the focal plane of the objective lens 60 (which is shown in its common form: an achromatic doublet). The objective lens is mounted in the instrument tube 61 by a threaded lock ring 62. The reticle 59 is mounted within the instrument tube by means of a lock ring 63 which clamps the reticle cell 64 (the reticle cell is a ring on which the cross hairs are strung) and the flange (as in 18 of FIGS. 1, 2 and 3) of the illuminatory mirror 65 against the rim 66 of the instrument tube.

The function of the device as shown in FIG. 17 is that light enters the objective lens 60 and is focused on the illuminatory mirror 65. That light which strikes the mirror 65 is reflected onto the reticle 59 (as in FIG. 13) thus illuminating it. That light which does not strike the mirror 65 will be transferred through the rest of the instrument, providing an image of the target area for the viewer (the viewer being further to the right but not shown). Thus part of the light entering the objective lens 60 is used to render the reticle 59 luminous. The images of the luminous reticle 59 and the target are superimposed so as to form one image; an image of a luminous reticle on the target.

Figure 18:
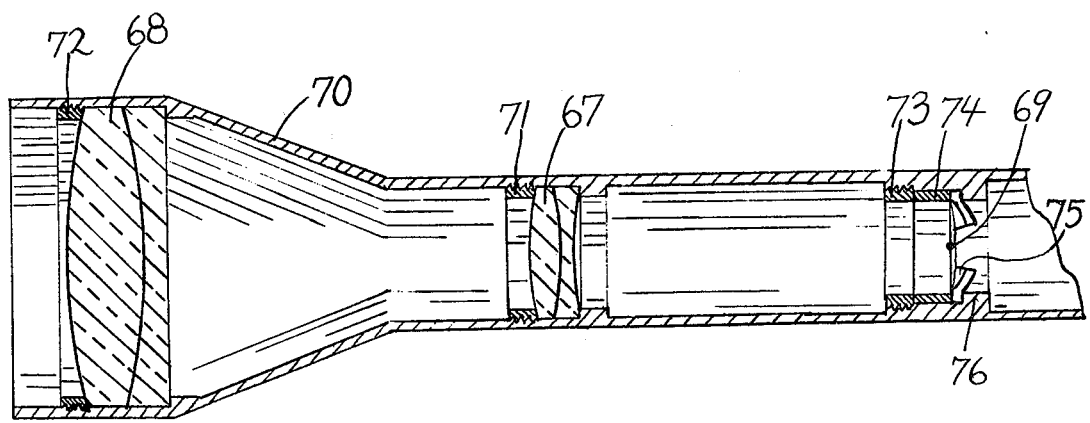
FIG. 18 is a cross section of the device showing the relative positions of the objective lens, the reticle and the first variation of the mirror, with lenses between the objective lens and the reticle mirror combination, all mounted in the instrument tube.

FIG. 18 shows a variation of the device, wherein a lens 67 comes between the objective lens 68 and the reticle 69. The lenses 67 and 68 are mounted in the instrument tube 70 by means of threaded lock rings 71 and 72 (respectively). The reticle 69 is mounted within the instrument's tube 70 by means of a threaded lock ring 73 which clamps the reticle cell 74 and the flange of mirror 75 against the rim 76.

The function of this variation of the device is identical to that of the device in FIG. 17, except that the device of FIG. 18 contains an extra lens 67. This lens 67 can have many purposes depending on the particular instrument; lens 67 is used for the optical considerations of the instrument rather than being particularly intended for reticle illumination itself. Such design considerations as image erection, aberration correction, focusing, changing magnification, image transfer, etcetera are all uses that may come up. Further there may be more than one lens 67 between the objective 68 and the reticle 69.

The essential point here is that intervening lenses do not change the function of the device, even if the reticle is mounted in the focal plane of the ocular lens (i.e. the maximum number of intervening lenses for a particular instrument is considered) as is common in telescopic sights. The device still takes light that comes through the objective lens and uses it to illuminate the reticle. The intervening lens's only effect on the functioning of the device is to change the effective focal length of the objective 68, the design of the mirror 75 naturally takes this into account.

In both FIGS. 17 and 18 the basic device is shown to be a lens, mirror reticle system. In both FIGS. 17 and 18 the mirror used is the one detailed in FIGS. 1, 2 and 3. Variations of the device would be had by replacing the mirror as in FIGS. 1, 2 and 3 by the mirror as in FIGS. 4, 5 and 6; or 7, 8 and 9; or the light funnel of FIGS. 10, 11 and 12. Since all these variations represent the same device, only the most basic device is drawn.

The viewer as mentioned in connection to the function of the device, views the illuminated reticle through further optical systems, that do not illuminate the reticle. In FIGS. 17 and 18 only structure essential to the illumination of the reticle itself is shown.

SUBVARIATIONS

In an optical instrument of fixed magnification, where the optics remain in a fixed state, it would be advantageous to use a mirror, or mirrors that have a curved shape, for the purpose of focusing light on the reticle, or reticles. This focusing would increase the efficiency of the system, thus allowing for a smaller mirror, or mirrors, and yeild more field of view. This would also work at a specific magnification in a variable "power" instrument.

In an optical instrument of variable magnification where lenses move to change the magnification, a conical or reversed curve mirror, or mirrors could be used to spread light so that the reticle, or reticles would be illuminated at all or some magnifications.

In an optical instrument intended for a use that doesn't require a large field of view, the mirror, or mirrors could be a complete ring, thus illuminating the reticle, or reticles more evenly.

It may be desirable to color the reticle to some color. Instead of making the reticle out of different colored materials, the mirror, or mirrors could be colored, so as to reflect a color onto the reticle.

A prism could be used to reflect light onto or through the reticle, or reticles, instead of a mirror.

A special lens could be used instead of a light funnel, in this case using refraction instead of reflection.

In a system similar to the second variation of the device, the mirror could be replaced by a special area on the lens in front of the reticle. This special area would resemble a fresnel lens around the edge of said lens. Again refraction is used.

While the device has been shown and described in detail, it is to be understood that changes may be made in the details of construction without departing from the spirit of the invention or the scope of the appended claims which follow:

Having thus described the invention, what is claimed is:

1. In an optical instrument having an objective lens within an outer tube member, a reticle and an illumination means for illuminating said reticle, said reticle mounted within said tube member along the longitudinal axis thereof, said illumination means comprising a pair of mirror means mounted to the inside surface of the tube member on either side of said axis adjacent said reticle, said mirror means having curved shapes for focusing light entering said tube member through said objective lens onto said reticle to illuminate same.

2. In an optical instrument as set forth in claim 1 wherein said reticle is plated with metal to increase its visibility upon illumination.

3. In an optical instrument as set forth in claim 1 wherein said reticle is colored to further increase its visibility.

4. In an optical instrument having an objective lens within an outer tube member, a reticle and an illumination means for illuminating said reticle said reticle comprising optical fiber means mounted transversely within said tube member, said illumination means comprising a pair of light pipe funnel means mounted longitudinally to opposed inside surfaces of said tube member, each said funnel means having light collecting ends directed towards said objective lens and light funneling ends in engagement with the ends of the optical fiber means whereby light entering said optical instrument through the objective lens is collected and directed by each said light pipe funnel means to said optical fiber means to illuminate same.

* * * * *